United States Patent [19]

Williams

[11] Patent Number: 4,713,280

[45] Date of Patent: Dec. 15, 1987

[54] RECEPTOR SHEET FOR IMPACT PRINTERS

[75] Inventor: Donald J. Williams, White Bear Lake, Minn.

[73] Assignee: Minnesota Mining and Manufacturing Company, St. Paul, Minn.

[21] Appl. No.: 891,231

[22] Filed: Jul. 29, 1986

[51] Int. Cl.⁴ ........................ B32B 5/16; B32B 27/30; B32B 27/34

[52] U.S. Cl. .................................... 428/149; 428/141; 428/195; 428/207; 428/411.1; 428/474.4; 428/475.2; 428/476.3; 428/480; 428/522; 428/524; 428/908; 428/323; 428/331; 346/135.1

[58] Field of Search ...................... 428/195, 206, 411.1, 428/323, 476.3, 908, 207, 409, 149, 141, 331, 480, 522, 524, 474.4, 475.2; 346/135.1

[56] References Cited

U.S. PATENT DOCUMENTS

| | | | |
|---|---|---|---|
| 3,867,168 | 2/1975 | Akman | 117/36.1 |
| 3,949,148 | 5/1976 | Akman | 428/500 |
| 4,301,195 | 11/1981 | Mercer et al. | 427/261 |
| 4,481,252 | 11/1984 | Postle et al. | 428/323 |
| 4,575,465 | 3/1986 | Viola | 427/261 |
| 4,592,951 | 6/1986 | Viola | 428/323 |

FOREIGN PATENT DOCUMENTS

| | | | |
|---|---|---|---|
| 0063151 | 4/1985 | Japan | 428/195 |
| 1032788 | 2/1986 | Japan | 346/135.1 |

*Primary Examiner*—Ellis P. Robinson
*Assistant Examiner*—James B. Monroe
*Attorney, Agent, or Firm*—Donald M. Sell; James A. Smith; David L. Weinstein

[57] ABSTRACT

Transparent sheet capable of receiving oil-based inks from impact ink transfer printers that use fabric ribbons. The sheet of this invention is non-tacky, and comprises a backing bearing on at least one major surface thereof an ink-receptive layer, capable of receiving oil-based ink from a fabric ribbon, said layer comprising a polymeric material having a Hansen dispersion parameter from about 10 to about 20 $J^{1/2}/cm^{3/2}$, a Hansen dipole parameter of less than about 6 $J^{1/2}/cm^{3/2}$, and a Hansen hydrogen bonding parameter from about 8 to about 20 $J^{1/2}/cm^{3/2}$. The ink-receptive layer can also contain particulate material.

10 Claims, No Drawings

RECEPTOR SHEET FOR IMPACT PRINTERS

BACKGROUND OF INVENTION

This invention relates to impact ink transfer printing, and, in particular, to transparent sheets capable of receiving inks from impact ink transfer printers.

A familiar example of impact ink transfer printing involves the common typewriter. As is well-known, ink is carried on a fabric ribbon which, when struck against the paper by the character to be typed, transfers a certain amount of ink to the paper, thereby forming an image of the striking character. Because the ribbon is exposed to air for long periods of time, the ink must be of a type that will not dry to such an extent that it will be incapable of transfer. At the same time, the image formed on a paper surface must be permanent, i.e. the ink must dry on the paper so that it will not be easily smeared. These seemingly incompatible requirements, namely, non-drying on the ribbon and immediate drying on the paper surface, are reconciled by the capillary action of the paper. When the ribbon contacts the paper, the ink rapidly diffuses into the latter, providing a relatively permanent image thereon and leaving the surface thereof relatively dry. The amount of ink necessary to form the image is sufficiently small to allow ink transfer to occur without paper being saturated.

Although the fabric ribbons described above have, in recent years, been replaced in conventional typewriting by wax on film, or "carbon", ribbons, which give an image having higher resolution and optical density, the fabric ribbon has become standard for dot-matrix computer printers. These printers combine speed, low cost, and the ability to print graphic images as well as text. This graphics capability renders the dot-matrix printer desirable for preparing overhead transparencies. Overhead transparencies are frequently used in visual presentations wherein images are commonly projected with magnification onto a screen for simultaneous viewing by a plurality of observers.

The dot-matrix printer comprises a matrix of fine wires or pins mounted in a traveling head. Each pin is electromechanically activated, through the driver circuitry, typically by a computer, to move toward the ribbon and impact it at high speed, thereby pressing it against the paper receptor sheet to form a dot. By activating the appropriate pins at the appropriate times, a matrix of dots can be produced in the form of the desired character. Since the character is formed electronically by the activation of individual pins, the output is not limited to any one set of characters, and the printer can print characters which are not a part of any font, but simply parts of a larger graphic image. This feature would allow the dot-matrix printer to be a useful tool for making images on transparent polymeric film if the ink could be made to deposit and dry on non-porous, polymeric film, as opposed to porous paper sheet.

The problem of depositing and drying ink on transparent polymeric film occurs with many computer output devices other than impact printers. For example, pen plotters and ink-jet printers produce images on polymeric film by means of aqueous-based inks. An ink-receptive polymeric film for aqueous-based inks has been prepared by providing on the surface of a polymeric backing a transparent hydrophilic coating which absorbs the ink and optionally allows subsequent evaporation of the ink vehicle. Such absorbent coatings tend to have numerous undesirable features, such as lack of durability, stickiness, susceptibility to fingerprinting, and sensitivity to moisture. U.S. Pat. No. 4,301,195 discloses an ink-receptive polymeric film having a protective coating provided over the ink-absorbing layer, said protective coating providing the desired handling and durability properties, while still allowing a suitable rate of ink passage through to the absorbent layer. Japanese patent application No. 108541 (May 30, 1984) discloses protective layers which are porous and Japanese patent application No. 155442 (July 27, 1984) discloses protective layers which have microcracks.

Ink used with impact ink transfer printers contain liquid vehicles and colorants which differ considerably from those used with pen plotters or ink-jet printers. A common feature of vehicles for inks for pen plotters and ink-jet printers is the use of water, ethylene glycol monoethyl ether, or other low volatility solvents which are either highly polar or highly hydrogen bonded, or both. Because inks for ink-jet printers must exhibit electrical conductivity, they generally utilize water in their formulation. Further, because inks for pen plotters and ink-jet printers must pass through small openings in applicators, solid pigments which might clog such openings cannot be used.

The primary requirements for impact transfer printing inks are that they must provide images of acceptable density, while being present on the fabric ribbon in relatively low quantities. If the ink is present in too great of a quantity, the ribbon will become wet or sticky and will soil the printed sheet in areas where imaging is not intended. Accordingly, the impact transfer printing ink must be formulated to have a very high color strength. A secondary requirement of impact transfer printing inks is that once an area of the ribbon has impacted the receptor surface, that area must have its ink supply replenished by having ink flow thereto from the surrounding unused area. Efforts by ribbon manufacturers to produce useable ribbons within these constraints have resulted in a variety of ink formulations, but a common feature of most of them is the use of mineral oil and oleic acid as components of the liquid vehicle, and the use of carbon black or other solid pigments to achieve the requisite color strength. Accordingly, ink-receptive surfaces suitable for use with these inks must be oleophilic rather than hydrophilic, and cannot depend exclusively upon diffusion of vehicle and dissolved dye, but also require means of anchoring solid pigment thereto.

In addition to absorbing ink, the ink-receptive surface of the transparency film must also have the durability and freedom from stickiness required for reliable printing and handling.

SUMMARY OF THE INVENTION

This invention involves a transparent, ink-receptive sheet that is both suitable for making transparencies for overhead projection and capable of being imaged by conventional impact ink transfer printers that employ fabric ribbons. Typical inks that are used with fabric ribbons have vehicles that are oil-based, such as, for example, oleic acid, mineral oil. Furthermore, the sheet of this invention is non-tacky, durable, and capable of being fed reliably through conventional impact ink transfer printers. The receptor sheet of this invention comprises a backing bearing on at least one major surface thereof an ink-receptive layer prepared from a composition having Hansen parameters selected so as to render the ink-receptive layer at least partially soluble in the oil-based vehicle of the ink, while leaving the ink-receptive layer non-tacky, i.e. having a coefficient of static friction of less than about 1.0, preferably below about 0.5. Ranges of Hansen parameters for the composition of the ink-receptive layer are from 10 to about 20 $J^{1/2}/cm^{3/2}$ for the Hansen dispersion parameter, less than about 6 $J^{1/2}/cm^{3/2}$ for the Hansen dipole parameter, and from about 8 to about 20 $J^{1/2}/cm^{3/2}$ for the Hansen hydrogen bonding parameter.

Fillers in particulate form can be added to the composition for preparing the ink-receptive layer to improve ink drying time on the ink-receptive layer, to improve the durability of the layer, and to reduce the tendency of the ribbon to stain the layer in the un-inked areas. The addition of particulate material does, however, increase the haze of the sheet, and the quantity thereof must be limited so as not to produce more than 20% haze.

The backing can be made of any flexible, transparent, polymeric material. A preferred backing material is polyethylene terephthalate. The ink-receptive layer can comprise any transparent, non-tacky, polymeric material which is at least partially soluble in vehicles conventionally used in inks used by impact ink transfer printers. A preferred polymeric material for the ink-receptive layer is polyvinyl butyral. The particulate fillers can comprise any transparent, non-abrasive particles of a size sufficiently large to provide a roughened surface to the ink-receptive layer but sufficiently small so as not to provide undesirable visual effects upon projection. A preferred particulate filler is amorphous silica having an average particle diameter of about 20 micrometers.

The receptor sheet of this invention is suitable for use with commercially available dot-matrix impact printers.

DETAILED DESCRIPTION OF INVENTION

The backing should be sufficiently flexible to travel through the paper path of conventional impact ink transfer printers that use fabric ribbons. Because the receptor sheet is to be used for preparing transparencies for overhead projection, the backing should be transparent to visible light. Representative examples of materials which are suitable for the backing include polyesters, polysulfones, polycarbonates, polyolefins, polystyrenes, cellulose acetate, and cellulose acetate-butyrate. A preferred backing material is polyethylene terephthalate. The thickness of the backing can vary, with a typical thickness ranging from about 1.5 mils (0.038 mm) to about 3.0 mils (0.076 mm).

The ink-receptive layer must allow penetration of the ink from the fabric ribbon, and must soften sufficiently to provide for binding thereto of any solid pigment present in the ink. These requirements can be satisfied by formulating the composition that comprises the ink-receptive layer to be at least partially soluble in the ink, i.e. the vehicle thereof. The properties which determine the solubility of the composition of the ink-receptive layer in the ink vehicle are the Hansen parameters, which are determined empirically by methods known to one of ordinary skill in the art. See, for example, Barton, *CRC Handbook of Solubility Parameters and Other Cohesion Parameters*, CRC Press Inc. (Boca Raton, Fla.: 1983), Kirk-Othmer Encyclopedia of Chemical Technology, Second edition, Supplement Volume, John Wiley & Sons, Inc. (New York: 1971), pp. 889–910. In the system devised by C. M. Hansen, the total cohesion parameter $\delta_t$ of a given material is broken down into three components, called Hansen parameters $\delta_d$, $\delta_p$, $\delta_h$, each of which is derived from one of the types of cohesive forces holding the material together.

If it is assumed that the cohesive energy $E_t$ arises from contributions from hydrogen bonding, as well as permanent-dipole-permanent-dipole interaction, and nonpolar interactions, the following equation can be written:

$$\Delta E_t = \Delta E_d + \Delta E_p + \Delta E_h \quad (1)$$

where $\Delta E_t$ represents the cohesive energy of the solid or liquid under consideration, $\Delta E_h$ represents the cohesive energy component derived from hydrogen bonding, $\Delta E_p$ represents the cohesive energy component derived from permanent-dipole-permanent-dipole interactions, $\Delta E_d$ represents the cohesive energy component derived from nonpolar interactions.

Dividing this equation by the molar volume of a solvent or molar volume of the repeating unit of a polymer gives:

$$\frac{\Delta E_t}{V} = \frac{\Delta E_d}{V} + \frac{\Delta E_p}{V} + \frac{\Delta E_h}{V} \quad (2)$$

where

V represents the molar volume of a solvent or molar volume of the repeating unit of a polymer or $$\delta_t^2 = \delta_d^2 + \delta_p^2 + \delta_h^2 \quad (3)$$

where $$\delta_d = (\Delta E_d/V)^{1/2} \quad (4)$$

$$\delta_p = (\Delta E_p/V)^{1/2} \quad (5)$$

$$\delta_h = (\Delta E_h/V)^{1/2} \quad (6)$$

$$\delta_t = (\Delta E_t/V)^{1/2} \quad (7)$$

where $\delta_d$ represents the dispersion component of the total solubility parameter, $\delta_p$ represents the polar component of the total solubility parameter, $\delta_h$ represents the hydrogen bonding component of the total solubility parameter, and $\delta_t$ represents the total solubility parameter.

According to Hansen's empirical studies, the likelihood of a given solvent i dissolving a solute j is high if $$^{ij}R < {}^{j}R \quad (8)$$

where $^{ij}R$ represents the distance of the solvent coordinates $({}^{i}\delta_d, {}^{i}\delta_p, {}^{i}\delta_h)$ from the center point $({}^{j}\delta_d, {}^{j}\delta_p, {}^{j}\delta_h)$ of the solute sphere of solubility, and $^{j}R$ represents the radius of the solute sphere of solubility. The usual procedure to derive what has been referred to as "the solute sphere of solubility" is to perform a solubility-parameter study by contacting the solute, e.g. polymer, in question with a limited number of solvents chosen specifically to examine behavior at all levels of the parameters concerned. These data are then plotted in a suitable manner and a region of solubility is defined by those solvents found to dissolve the particular solute.

When the three Hansen parameters are employed, it is preferable to use a spherical representation of the region of solubility. The value of ${}^{ij}R$ is calculated by the following formula:

$$^{ij}R = [4(^{i}\delta_d - {}^{j}\delta_d)^2 + (^{i}\delta_p - {}^{j}\delta_p)^2 + (^{i}\delta_h - {}^{j}\delta_h)^2]^{\frac{1}{2}} \quad (9)$$

The value of ${}^{j}R$ is, as stated previously, determined empirically. Additional detailed information relating to ${}^{ij}R$, ${}^{j}R$, and the sphere of solubility can be found in Barton, *CRC Handbook of Solubility Parameters and Other Cohesion Parameters*, CRC Press, Inc. (Boca Raton, Fla.: 1983), Chapters 5, 8, 16, incorporated herein by reference.

When the component Hansen parameters of a given material (solid or liquid) are very near to those of a second material (solid or liquid), the two materials will be able to mix, assuming that both materials are not solid. In the case of a solute, e.g. a polymer, and a solvent, when the component Hansen parameters of the solute are near those of the solvent, the polymer will be soluble in the solvent. The matching of the three component parameters does not have to be exact, but the closer the match, the higher the degree of solubility, as can be deduced from Equations (8) and (9).

Because every solid and liquid has three component Hansen parameters, it is necessary, in order for solubility to occur, that the differences between ${}^{i}\delta_d$ and ${}^{j}\delta_d$, ${}^{i}\delta_p$ and ${}^{j}\delta_p$, and ${}^{i}\delta_h$ and ${}^{j}\delta_h$ be sufficiently small that the value of ${}^{ij}R$, as calculated from Equation (9), be less than ${}^{j}R$ (Equation (8)). However, in the case of ink-receptive layers for the sheet of this invention, it has been discovered that although the Hansen dispersion and dipole parameters of the ink-receptive layer should be relatively close to those of the vehicle of the ink, the Hansen hydrogen bonding parameter of the layer should be much higher than that of the vehicle of the ink in order to provide sufficient ink drying on the ink-receptive layer, sufficient pigment adhesion to the ink-receptive layer, and sufficient non-tackiness to the ink-receptive layer. It is this finding which mandates that such highly hydrogen bonded polymers as polyvinyl butyral and certain polyamides be used as ink-receptive layers for inks for impact ink transfer printers, even though strict adherence to the rules of component Hansen parameter matching would lead one of ordinary skill in the art to avoid using them.

As mentioned previously, the primary liquid components of the inks normally used in the fabric ribbons of dot-matrix printers are oil-based, e.g. usually containing mineral oil and oleic acid, which have the Hansen parameters given in Table I. The Hansen parameters in Table I were obtained from Barton, supra, where they were compiled from published experimental data.

TABLE I

| Ink vehicle | Hansen parameter ($J^{\frac{1}{2}}/cm^{3/2}$) | | |
|---|---|---|---|
| | δd | δp | δh |
| Oleic acid | 14.3 | 3.1 | 5.5 |
| Mineral oil (ASTM #1) | 13.9 | 0.0 | 0.0 |
| Mineral oil (ASTM #2) | 15.6 | 0.6 | 0.2 |
| Mineral oil (ASTM #3) | 16.6 | 1.0 | 0.4 |

SOURCE: Barton, CRC Handbook of Solubility Parameters and Other Cohesion Parameters, CRC Press, Inc. (Boca Raton, Fla.: 1983), p. 159, 160.

Hansen parameters for commercially available polymers are shown in Table II. These parameters were also obtained from Barton, supra, or calculated using generally accepted mathematical procedures given in Van Krevelen, *Properties of Polymers*, 2nd Ed., Elsevier Scientific Publishing Company (Amsterdam: 1976).

TABLE II

| Polymer | Hansen Parameter ($J^{\frac{1}{2}}/cm^{3/2}$) | | |
|---|---|---|---|
| | δd | δp | δh |
| Polyvinyl acetate[1] | 20.9 | 11.3 | 9.6 |
| Polyvinyl butyral[1] | 18.6 | 4.4 | 13.0 |
| Polyvinyl butyral: polyvinyl alcohol (50:50)[2] | 17.3 | 4.7 | 18.5 |
| Polyvinyl alcohol[2] | 16.0 | 5.0 | 23.9 |
| Polyisobutylene[1] | 14.5 | 2.5 | 4.7 |
| Polystyrene[1] | 21.3 | 5.8 | 4.3 |
| Styrene-butadiene elastomer[1] | 17.6 | 3.4 | 2.7 |

[1]SOURCE: Barton, CRC Handbook of Solubility Parameters and Other Cohesion Parameters, CRC Press, Inc. (Boca Raton, Fla.: 1983), p. 296
[2]SOURCE: Van Krevelen, Properties of Polymers, 2nd Ed., Elsevier Scientific Publishing Company (Amsterdam: 1976)

If the only criterion for choosing materials for the ink-receptive layer were solubility in the ink, then the layer could be formulated simply by finding a soluble polymer or soluble blend of polymers having component Hansen parameters within perhaps 2.0 $J^{\frac{1}{2}}/cm^{3/2}$ of those of the ink vehicle. Polymers which meet this requirement are commercially available, and similar results could be achieved by preparing blends of two or more polymers. However, the ink-receptive layer has other requirements, the chief being that the material of the ink-receptive layer not be tacky. As used herein, "tack" is intended to refer to the degree of softness of the ink-receptive layer. This requirement conflicts with the requirement of matching component Hansen parameters of the ink-receptive layer material with those of the ink, since the Hansen parameters given in Table I are rather low, and solids having low component Hansen parameters tend to be excessively sensitive to pressure, and consequently have a high degree of tack. It has been discovered, however, that the difference in component Hansen parameter values between ink vehicle and ink-receptive layer material that can be tolerated is not the same for all three parameters.

For the dispersion component of ink-receptive layer material, a range of 10 to 20 $J^{\frac{1}{2}}/cm^{3/2}$ has been found to be the approximate limit of variability for inks having a dispersion component in the range of 14 to 16 $J^{\frac{1}{2}}/cm^{3/2}$, if reasonably short drying times are desired. The dipole component of the ink-receptive layer material should not have a value above about 6 $J^{\frac{1}{2}}/cm^{3/2}$. However, the hydrogen bonding component of the ink-receptive layer material can have a value as high as 20 $J^{\frac{1}{2}}/cm^{3/2}$, preferably no higher than about 16 $J^{\frac{1}{2}}/cm^{3/2}$, and still provide satisfactory ink absorption, even though the hydrogen bonding component of oleic acid is only 3.1 $J^{\frac{1}{2}}/cm^{3/2}$ and that of most mineral oils is less than 1.0 $J^{\frac{1}{2}}/cm^{3/2}$. Furthermore, the hydrogen bonding component of the ink-receptive layer material should not have a value lower than about 8 $J^{\frac{1}{2}}/cm^{3/2}$, and preferably no lower than about 12 $J^{\frac{1}{2}}/cm^{3/2}$. The discovery that the Hansen hydrogen bonding parameter of the ink-receptive layer should be so much higher than that of the ink vehicle was surprising. Strict adherence to Hansen parameter matching would have restricted the range of useable materials to those with rather low Hansen hydrogen bonding parameters, e.g. in the range of from 0 to 8 $J^{\frac{1}{2}}/cm^{3/2}$. The use of a higher than expected Hansen hydrogen bonding parameter allows the use of polymers that have a high level of durability, such as, for example, polyvinyl butyral and certain polyamides.

Additives such as plasticizers and anti-oxidants and polymers that do not have component Hansen parameters within the required range may be incorporated into the composition used to formulated the ink-receptive layer so long as the resulting ink-receptive layer has component Hansen parameters within the required range.

While the published Hansen parameters serve as a guide to selection of materials for the ink-receptive layer, it is strongly preferred to conduct a laboratory test to determine whether ink receptivity is satisfactory. This test involves applying a specially formulated test ink consisting of a 5% by weight solution of crystal violet dye dissolved in oleic acid (95% by weight) to the test surface by means of a metered coating device, e.g. Pamarco Flexo Hand Proofer (Pamarco, Roseville, N.J., 07203). This particular proofer is equipped with a 200 screen count tri-helical cylinder.

After application of the ink, the coated layer is evaluated by testing the ink dryness at intervals of 35 seconds, two minutes, five minutes, and 10 minutes. The dryness test is performed by rubbing a cotton swab (Scientific Products Division of American Hospital Supply, Catalog No. A5002-1, 6" size) gently across the inked area. Dryness is indicated by lack of smudging or transfer of ink to the swab. If drying to the point of non-smudging or non-transfer occurs in ten minutes or less, the ink receptivity is considered acceptable.

The Hansen parameters specified above are necessary, but not sufficient, conditions for a satisfactory ink-receptive layer for transparent sheet material for use with impact ink transfer printers that use fabric ribbons. In addition, the receptor sheet must be non-tacky, handleable under the conditions to which transparencies are normally subjected, and feedable reliably in conventional impact ink transfer printers. Furthermore the surface of the ink-receptive sheet must be of sufficient durability to remain useable after such handling and feeding.

The coefficient of static friction measured against aluminum according to ASTM D 1894 (1978) correlates well with the ability of a particular transparent sheet of this invention and ink-receptive layer thereof to meet such requirements, especially non-tackiness. For example, coefficients of static friction against aluminum of greater than 1.0 indicate a rubbery or tacky surface. Coefficients of static friction of from about 0.5 to about 1.0 indicate that the surface may be somewhat soft, but still useable. Coefficients of static friction equal to or less than 0.5 indicate that the sheet and ink-receptive layer thereof should be non-tacky and should handle well and feed reliably in most impact ink transfer printers, though the exact coefficient of static friction that can be tolerated is dependent upon the mechanical details of the particular printer under consideration, as well as upon such features as the film beam strength, and hence caliper.

It has also been found that handling and imageability can be improved by the addition of particulate material to the ink-receptive layer, provided that such additives do not increase the haze to an unacceptable level. The particulate material acts to roughen the surface of the ink-receptive layer. Rougher surfaces have more surface area available to attract and hold the colorant material of the ink.

In addition, the rough surface attributable to the particulate material provides protection to the applied ink image by keeping other surfaces, such as other sheets of film or mechanical parts of the printer, away from the ink-receptive layer. Because the materials of the ink-receptive layer used in sheets of this invention are very absorbent of ink, it is possible for ink to transfer from the ribbon to the layer even with only light contact, in the absence of pressure from the printhead. If this happens, the film will be stained in areas where imaging was not intended. Roughening the surface with particulate material will prevent this type of staining by maintaining a slight distance between the ribbon and the ink-receptive surface, except in imaged areas, where the printhead presses the ribbon down between the protuberances attributable to the particles and against the ink-absorbing material of the ink-receptive layer.

Most commercially available impact ink transfer printers are designed primarily for feeding paper, and accordingly, depend upon the surface friction and roughness properties of paper for proper functioning. It has been found that very smooth films coated with ink-receptive coatings do not feed well into these machines, but that the addition of appropriate particulate materials increases the coefficient of friction of the surface, measured against feed-roll materials of the type used in impact ink transfer printers, and allows satisfactory feeding.

Addition of particulate materials is not without disadvantage, however. The primary disadvantages of adding particulates are increased haze, lack of background clarity, and abrasiveness of the surface.

A primary requirement for particles used in the ink-receptive layer is that they be transparent. Even the most transparent particles will, however, produce some haze, because first, most particulate materials have a refractive index different from that of the ink-receptive material, and second, the particles act as tiny lenses or prisms, directing the light in many different directions. This redirection of light, or diffusion, is the primary cause of haze. Haze can be minimized by using larger particles, and fewer of them, since much of the light passing through the film will never encounter a particle, and therefore will not be diffused. The particle size is limited by the requirement that they not be visible as individual particles on the projection screen. Particles which are flake-like, rectangular, or plate-like are less likely to cause haze that spherical particles, because spherical particles act as lenses, and produce objectionable background spots. Particles with flat surfaces are most desirable from an optical standpoint. It is preferred that the upper limit of haze not exceed 20%, as measured in accordance with ASTM D 1003-61 (Reapproved 1977).

A second consideration in the choice of particulate material is abrasiveness. Many cubic or plate-like particles which may be quite desirable optically are very hard and have sharp edges which scratch other film surfaces. This is especially true of larger particles. An example of a particulate material that is available in large sizes (up to 20 or more micrometers average diameter) and which is suitably non-abrasive is amorphous silica. A commercially available amorphous silica suitable for this invention is "Syloid 620", available from W. R. Grace and Co.

It is preferred, if surface roughening is to be produced by the addition of particulate material to the ink-receptive layer, that the amount of ink-receptive material in the ink-receptive layer be at such a level that the value of Sheffield smoothness for the ink-receptive layer be at least 30, as measured in accordance with TAPPI Useful Method 518. As illustrated in the examples, this can be done by formulating the coating solution to have a sufficiently low concentration of ink-receptive material, and by the coating process, wherein the amount of coating solution applied is kept sufficiently low to allow the dried coating layer have a Sheffield smoothness in excess of 30.

The receptor sheet of this invention can be prepared according to conventional procedures. For example, the ink-receptive material for the ink-receptive layer is dissolved in a suitable solvent. Then the particulate material is added to the resulting solution. The solution is then preferably homogenized, and finally coated onto the backing and oven dried, typically at about 70° C. to about 90° C. for about 1 min. to about 10 min. Typical coating weights range from about 0.1 g/ft$^2$ to about 0.5 g/ft$^2$. Coating can be conducted by conventional means, such as for example reverse roll coating, knife coating, and gravure coating.

Good adhesion of the ink-receptive layer to the backing is vital to film performance. In some cases, adhesion of the ink-receptive layer to the backing can be improved by applying a primer to the backing or by the addition of adhesion promoters to the coating composition. In most cases, such promoters are added in amounts sufficiently small so as not to affect the solubility of the ink-receptive material.

The sheets of the present invention can be used to prepare transparencies from printing devices that use oil-based inks. The sheets are particularly useful for preparing transparencies with dot-matrix impact printers that use fabric ribbons.

In order to more clearly point out the advantages of the invention, the following non-limiting examples are provided.

In the following examples, haze was measured in accordance with the procedures described in ASTM D 1003-61 (Reapproved 1977) and Sheffield smoothness was measured in accordance with the procedures described in TAPPI Useful Method 518.

EXAMPLE I

A premix was prepared by dissolving 25 parts by weight of polyvinyl butyral (XYSG, Union Carbide Corp.) in 225 parts by weight of ethanol. This premix was blended with toluene and amorphous silica ("Syloid 620", W. R. Grace and Co.) in the amounts indicated below:

| | |
|---|---|
| Premix | 1400 grams |
| Toluene | 140 grams |
| Amorphous silica ("Syloid 620") | 7.0 grams |

The resulting composition was homogenized twice at 8000 psi in a Manton-Gaulin laboratory homogenizer and coated onto unprimed polyethylene terephthalate backing having 1.9 mil caliper, by means of a reverse roll coater, at a coating weight of 0.14 grams per square foot. The sheet was dried at 185° F. (85° C.) for two minutes. Haze of the resulting sheet was 10.8% and Sheffield smoothness was 85. The drying time for no smudging was 35 seconds as determined by the drying test described previously. This sheet was also imaged with the Epson FX-85 dot-matrix printer, and the image tested with a cotton swab in the manner described previously. Drying time of the image printed by the printer was less than 35 seconds, which was considered very satisfactory. This sheet ran smoothly in the printer, without misfeeding.

COMPARATIVE EXAMPLE A

The premix described in Example I was blended with amorphous silica ("Syloid 620") and urea formaldehyde particles ("Pergopak M2", Ciba-Geigy) in the amounts indicated:

| | |
|---|---|
| Premix | 1400 grams |
| Toluene | 140 grams |
| Amorphous silica | 7 grams |
| Urea formaldehyde | 4.2 grams |

The resulting composition was twice homogenized at 8000 psi in a Manton-Gaulin laboratory homogenizer and coated onto polyvinylidene chloride primed polyethylene terephthalate backing of 2.5 mil caliper, by means of a reverse roll coater, at a coating weight of 0.17 grams per square foot. The sheet was dried at 185° F. (85° C.) for two minutes. Haze on the resulting sheet was 25.2% and the Sheffield smoothness was 125, indicating that it was somewhat rougher than the sheet prepared in Example I. The drying time for no smudging was less than 35 seconds as determined by the drying test described previously. This sheet was also imaged with the Epson FX-85 dot-matrix printer, and the image tested with a cotton swab in the manner described previously. Drying time of the image printed by the printer was less than 35 seconds, which was considered very satisfactory. The sheet ran very smoothly in the printer, without misfeeding. The urea-formldehyde particle diameter was 0.1–0.15 micrometers, and they formed into clumps having diameter of 6 to 8 micrometers. Amorphous silica particles have an average diameter of 20 micrometers. This example shows how the addition of smaller particles can enhance roughness, but at the same time increase haze to an undesirable level.

EXAMPLE II

Sheets were prepared with ink-receptive layers made from the polymers shown in Table III. The polymers were first dissolved in appropriate solvents at concentrations of 10%, based on the weight of total solution. Each solution was coated onto a polyethylene terephthalate backing by means of a laboratory knife coater. The sheets were dried at 180° F. (82° C.) for eight minutes. Ink receptivity was measured with the test ink applied with the Pamarco hand proofer, as described previously. The specific polymers used, their component Hansen parameters, ink drying times, and quality of surface (tacky or non-tacky) are shown in Table III.

TABLE III

| | Hansen Parameter ($J^{1/2}/cm^{3/2}$) | | | Drying | Surface |
|---|---|---|---|---|---|
| Polymer | $\delta d$ | $\delta p$ | $\delta h$ | time | tack |
| Polyisobutylene ("Vistanex L-100", Exxon Corp.) | 14.5 | 2.5 | 4.7 | 2 min | tacky |
| Styrene-butadiene rubber | 17.6 | 3.4 | 2.7 | 2 min | tacky |

TABLE III-continued

| Polymer | Hansen Parameter ($J^{\frac{1}{2}}/cm^{3/2}$) δd | δp | δh | Drying time | Surface tack |
|---|---|---|---|---|---|
| ("Kraton 1101", Shell Oil Company) | | | | | |
| Cellulose nitrate (½ second, Hercules Inc.) | 15.4 | 14.7 | 8.8 | ND* | non-tacky |
| Polyvinyl acetate ("Vinac B-100", Air Products and Chemicals Inc.) | 20.9 | 11.3 | 9.6 | ND | non-tacky |
| Polyvinyl butyral (XYSG, Union Carbide Corp.) | 18.6 | 4.4 | 13.0 | 35 sec | non-tacky |
| Polyamide ("Versamid 930", Hankel Corp.) | 17.4 | −1.9 | 14.9 | 10 min | non-tacky |
| Polyvinyl alcohol ("Vinsol 540", Air Products and Chemicals, Inc.) | 16.0 | 5.05 | 23.9 | ND | non-tacky |
| Blend of 67% polyvinyl butyral and 33% polyvinyl alcohol | 17.7 | 5.3 | 16.6 | 35 sec | non-tacky |
| Blend of 50% polyvinyl butral and 80% polyvinyl alcohol | 17.3 | 5.8 | 18.5 | 35 sec | non-tacky |
| Polystyrene ("Styron 700", Dow Chemical Co.) | 21.3 | 5.8 | 4.3 | ND | non-tacky |

*ND means that the ink did not dry

The results shown in Table III illustrate the effects upon ink-receptive layer of varying the Hansen parameters of the polymeric composition. Those sheets wherein the polymers of the ink-receptive layer had all three Hansen parameters within the acceptable ranges had ink drying times, measured with the test ink and cotton swab method, of 10 minutes or less, and the ink-receptive layers were non-tacky. These sheets were considered acceptable. As seen in Table III, the acceptable polymers were polyamide, polyvinyl butyral, and certain blends of polyvinyl alcohol and polyvinyl butyral.

The test ink and cotton swab method for evaluating ink drying is more severe than actual runs on a printer. For example, samples of ink-receptive layers made with "Versamid 930" polyamide were run in an Epson FX-85 dot-matrix printer, and ink drying time was only five minutes, rather than the ten minutes given in Table III for the test ink applied with the Pamarco hand proofer. Further, the results given in Table III were for ink-receptive layers consisting of polymers only, without any particulate material added. Particulate materials in the ink-receptive layer further decrease the ink drying time.

Polymers listed in Table III that had Hansen parameters which were outside of the Hansen parameter ranges prescribed by this invention were found to be unacceptable, either because of tackiness, as in the case of polyisobutylene and styrene-butadiene rubber, or because of failure to dry the ink, as in the case of cellulose nitrate, polyvinyl acetate, polyvinyl alcohol, and polystyrene. It was also found that when polyvinyl alcohol was blended with polyvinyl butyral in amounts of about 80% or more by weight polyvinyl alcohol, the resulting ink-receptive layer no longer dried the ink satisfactorily, even though polyvinyl butyral alone or polyvinyl butyral blended with lower percentages of polyvinyl alcohol provided an excellent ink-receptive layer, with good drying.

Various modifications and alterations of this invention will become apparent to those skilled in the art without departing from the scope and spirit of this invention, and it should be understood that this invention is not to be unduly limited to the embodiments set forth herein.

What is claimed is:

1. A transparent, non-tacky sheet comprising a backing bearing on at least one major surface thereof an ink-receptive layer, capable of having images formed thereon by means of oil-based inks, said layer formed from a polymeric composition having a Hansen dispersion parameter of from about 10 to about 20 $J^{\frac{1}{2}}/cm^{3/2}$, a Hansen hydrogen bonding parameter of from about 8 to about 20 $J^{\frac{1}{2}}/cm^{3/2}$, and a Hansen dipole parameter of less than about 6 $J^{\frac{1}{2}}/cm^{3/2}$, said layer further having a Sheffield smoothness of at least about 30 as measured in accordance with TAPPI Useful Method 518 and a haze value of 20% or less, as measured in accordance with ASTM D1003-61 (reapproved 1977).

2. Sheet according to claim 1 wherein said ink-receptive layer has a coefficient of static friction of equal to or less than 0.5, as measured in accordance with ASTM D 1894 (1978).

3. Sheet according to claim 1 wherein said polymeric material is selected from the group consisting of polyvinyl butyral, polyamide, and blends of polyvinyl butyral and polyvinyl alcohol.

4. Sheet according to claim 1 wherein said composition further comprises particulate material.

5. Sheet according to claim 4 wherein said particulate material comprises amorphous silica.

6. Sheet according to claim 1 wherein said ink-receptive layer has a Hansen hydrogen bonding parameter of from about 12 to about 16 $J^{\frac{1}{2}}/cm^{3/2}$.

7. Sheet according to claim 1 wherein said backing comprises a polymeric material.

8. Sheet according to claim 1 wherein said oil-based ink is provided by a fabric ribbon.

9. Sheet according to claim 8 wherein said oil-based ink comprises a vehicle selected from the group consisting of oleic acid and mineral oil.

10. Sheet according to claim 1 wherein said ink-receptive layer has a coefficient of static friction of less than about 1.0, as measured in accordance with ASTM D 1894 (1978).

* * * * *

UNITED STATES PATENT AND TRADEMARK OFFICE

CERTIFICATE OF CORRECTION

PATENT NO. : 4,713,280

DATED : December 15, 1987

INVENTOR(S) : Donald J. Williams

It is certified that error appears in the above-identified patent and that said Letters Patent is hereby corrected as shown below:

Col. 2, line 12, "ink" , first occurrence, should be -- inks --.

Col. 11, line20, "80%" should be --50%--

Col. 11, line 21, "Blend of 20% polyvinyl butyral 16.5 6.6 21.7 ND non-tacky" should be added Col. 11, line 22, "and 80% polyvinyl alcohol" should be added Col. 11, line 23, "the" should be added before --ink-receptive-- and after --upon--

Signed and Sealed this

Sixteenth Day of August, 1988

*Attest:*

DONALD J. QUIGG

*Attesting Officer*

*Commissioner of Patents and Trademarks*